(12) United States Patent
Menke et al.

(10) Patent No.: US 7,971,708 B2
(45) Date of Patent: Jul. 5, 2011

(54) CONVEYOR MAT MODULE, CONVEYOR MAT AND CONVEYOR

(75) Inventors: Cornelis Hendrik M. Menke, Den Haag (NL); Rick Wilhelmus Van Den Berg, Monster (NL)

(73) Assignee: Rexnord Flattop Europe B.V., 'S-Gravenzande (NL)

( * ) Notice: Subject to any disclaimer, the term of this patent is extended or adjusted under 35 U.S.C. 154(b) by 58 days.

(21) Appl. No.: 12/295,735

(22) PCT Filed: Feb. 22, 2007

(86) PCT No.: PCT/NL2007/050075
§ 371 (c)(1),
(2), (4) Date: Jun. 4, 2009

(87) PCT Pub. No.: WO2007/114694
PCT Pub. Date: Oct. 11, 2007

(65) Prior Publication Data
US 2009/0250324 A1  Oct. 8, 2009

(30) Foreign Application Priority Data

Apr. 5, 2006 (NL) .................................. 1031522
Jun. 29, 2006 (NL) .................................. 1032089

(51) Int. Cl.
*B65G 17/06* (2006.01)
(52) U.S. Cl. ....................................... 198/851; 198/779

(58) Field of Classification Search .......... 198/850–853, 198/779
See application file for complete search history.

(56) References Cited

U.S. PATENT DOCUMENTS

| 1,402,766 | A |   | 1/1922  | Hay |
| 1,826,351 | A |   | 3/1930  | Hoefen |
| 2,515,080 | A | * | 7/1950  | Dalrymple ................... 198/851 |
| 2,862,609 | A |   | 12/1958 | Bechtel, Jr. |
| 6,098,792 | A | * | 8/2000  | Olsson ....................... 198/850 |
| 6,318,544 | B1 | * | 11/2001 | O'Connor et al. ........... 198/853 |
| 6,932,211 | B2 |  | 8/2005  | Wieting et al. |
| 7,267,221 | B2 | * | 9/2007  | Hall ............................ 198/853 |
| 7,527,146 | B2 |  | 5/2009  | Stebnicki et al. |
| 7,546,726 | B1 | * | 6/2009  | Wu ................................ 59/78 |

FOREIGN PATENT DOCUMENTS

| DE | 10033499 A1 | 1/2002 |
| EP | 1473260 A1  | 3/2004 |
| GB | 519338      | 3/1940 |
| GB | 838115      | 6/1960 |
| WO | 0179085 A1  | 10/2001 |
| WO | 2007114694 A1 | 10/2007 |

* cited by examiner

*Primary Examiner* — Mark A Deuble
(74) *Attorney, Agent, or Firm* — Quarles & Brady LLP

(57) ABSTRACT

A module for a modular conveyor mat, comprising a sheet metal body part (2) bent-over, in cross section, into a substantially inversed U-shape, wherein the connecting part of the U forms a conveying face and wherein the legs of the U form side faces (6, 7) located adjacent longitudinal edges of the conveying face, extending downwards relative to the conveying face, which side faces are provided adjacent the front and rear side (8, 9) of the body part (2) with openings (10) for receiving hinge pins (22) therethrough.

22 Claims, 8 Drawing Sheets

CONVEYOR MAT MODULE, CONVEYOR MAT AND CONVEYOR

CROSS REFERENCE TO RELATED APPLICATIONS

This application represents the national stage application of International Application PCT/NL2007/050075 filed Feb. 22, 2007, which claims the benefit of Netherlands Patent Application 1031522, filed Apr. 5, 2006, and Netherlands Patent Application 1032089, filed Jun. 29, 2006, which are incorporated herein by reference in their entirety for all purposes.

The invention relates to a modular conveyor mat and a conveyor mat module for a modular conveyor mat.

Modular conveyor mats are generally known and are utilized for conveying all sorts of products in a large number of environments. A particularly demanding use for a modular conveyor mat is the conveyance of products through a pasteurizer or cooler.

An example thereof is a tunnel pasteurizer or tunnel cooler, wherein the modular conveyor mat passes through a housing. In the housing, a number of zones are realized in which the temperature of the products to be conveyed can be influenced with heat exchanging medium. An example is a beer bottle or beer can to be pasteurized which, with the aid of the modular transport mat, is passed through a number of zones within the housing, in which hot water is sprayed on the bottle with, each time, per zone, a different temperature, for instance 40-60-40-20° C. In such a tunnel pasteurizer or tunnel cooler, the modular conveyor mat can, for instance, be 6.5 meters wide and up to 40 meters long. Such a conveyor conveys the products at a velocity of approximately 0.5-1 m/min and may have a capacity of approximately 70,000 beer bottles or beer cans per hour. In the water zones, per $m^2$ of track surface, approximately 25 $m^3$ of water is sprayed per hour on the beer bottles or cans. For a more efficient use of the water, two conveyors can be arranged within one housing, one above the other.

On account of their favourable cost price and light weight, as a rule, it is preferred to use plastic modules in modular conveyor mats.

However, for some uses, for instance heavily loaded tunnel pasteurizers, it has been proposed to provide a hybrid conveyor mat. In such a hybrid conveyor mat, an endless base structure composed of metal modules is used, which is provided with plastic product carriers forming the conveying surface.

The base structure of the conveyor mat is then of modular design from metal elements, which absorb the tensile forces that are formed upon conveyance, and which are furthermore form-retaining and wear resistant and resistant to ageing. The plastic product carriers facilitate handling the products, for instance during transfer from or to a different conveyor. As they do not form part of the base structure, the form stability and wear resistance of the product carrier is less critical, so that designing them in plastic is well possible. Examples of such hybrid conveyor mats are described in, for instance, U.S. Pat. No. 5,197,591 and U.S. Pat. No. 6,615,979 in the name of Ashworth.

A drawback of the known hybrid conveyor mats is that sometimes, they are still insufficiently strong and/or relatively complex.

In practice, for heavily loaded uses, often, metal conveyors are used, designed as wire mesh belt or as metal table top chains. A drawback of such metal conveyors is that placing products on and removing products from the conveyor is difficult, for instance in that the conveying surface cannot cooperate with fingers of a transferring device. Further, such steel conveyors have no modular structure in lateral direction. The object of the invention is a modular conveyor mat and a module therefor with a high tensile strength, while the drawbacks mentioned can be avoided. To that end, the invention provides a module for a modular conveyor mat, comprising a sheet metal body part bent-over, in cross section, into a substantially inversed U-shape, with the connecting part of the U forming a conveying face and wherein the legs of the U, located adjacent longitudinal edges of the conveying face, form side faces extending downwards relative to the conveying face, which side faces are provided, adjacent the front and rear side of the body part, with openings for receiving hinge pins therethrough.

With the aid of a module formed by such a bent-over sheet metal body part, a conveyor having a high tensile strength and a simple modular structure can be formed.

The invention also relates to a modular conveyor mat and to a conveyor.

Further advantageous embodiments of the invention are represented in the subclaims.

The invention will be further elucidated with reference to an exemplary embodiment represented in a drawing. In the drawing.

The Figures are merely schematic representations of preferred embodiments of the invention, and are given by way of non-limitative exemplary embodiment. In the Figures, identical or corresponding parts are indicated by identical reference numerals.

Figure 1:
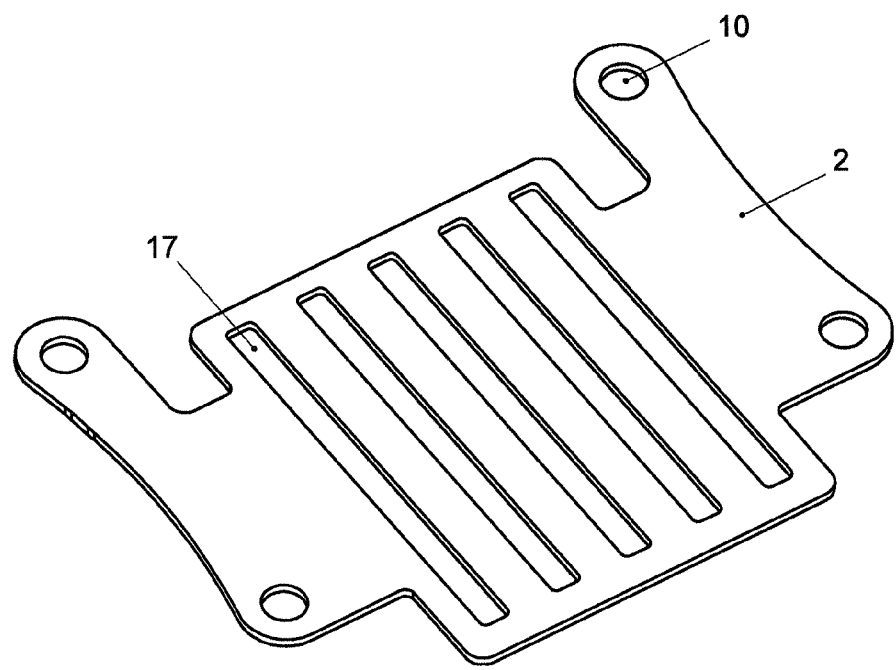
FIG. 1 shows a schematic, perspective view of a body part of a module according to the invention in flat condition.
Figure 2:
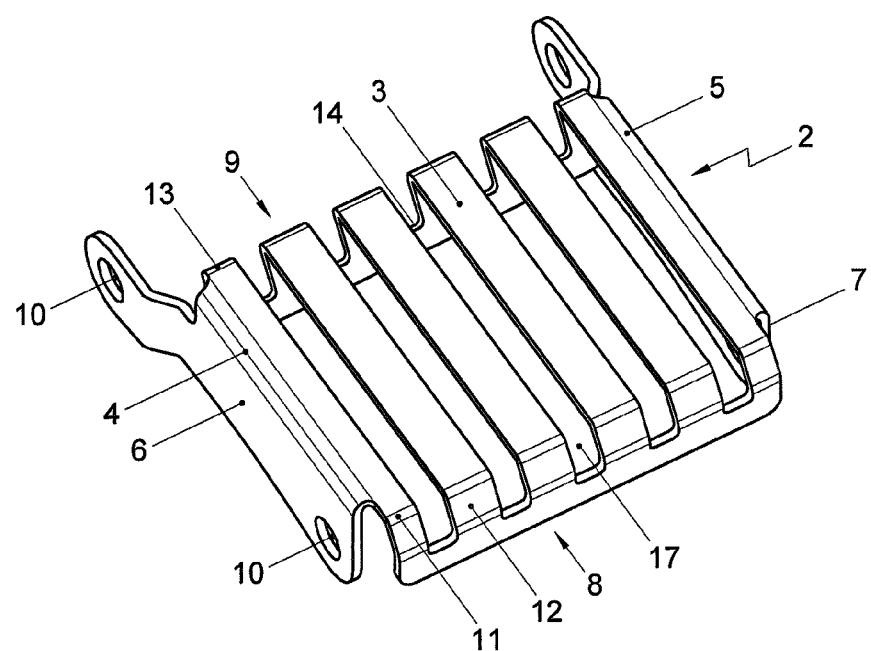
FIG. 2 shows a schematic perspective view of a body part of FIG. 1 in bent-over condition.

With reference to FIGS. 1-4, in particular FIG. 2, a module 1 for a modular conveyor mat is shown. The module 1 comprises a sheet metal body part 2 bent-over, in cross section, into a substantially U-shaped form. The connecting part of the U forms a conveying face 3. The legs of the U form side faces 6, 7 located at the longitudinal edges 4, 5 and extending downwards relative to the conveying surface 3. Adjacent the front side 8 and the rear side 9, the side faces are provided with openings 10 for receiving hinge pins therethrough.

At the rear side 9 of the body part 2, the side walls extend beyond the conveying face 3.

The body part 2 is further provided at the front edge 11 with a front face 12 extending downwards relative to the conveying face 3. The body part 2 is also provided at the rear side 13 with a rear face 14 extending downwards relative to the conveying face 3.

Figure 3:
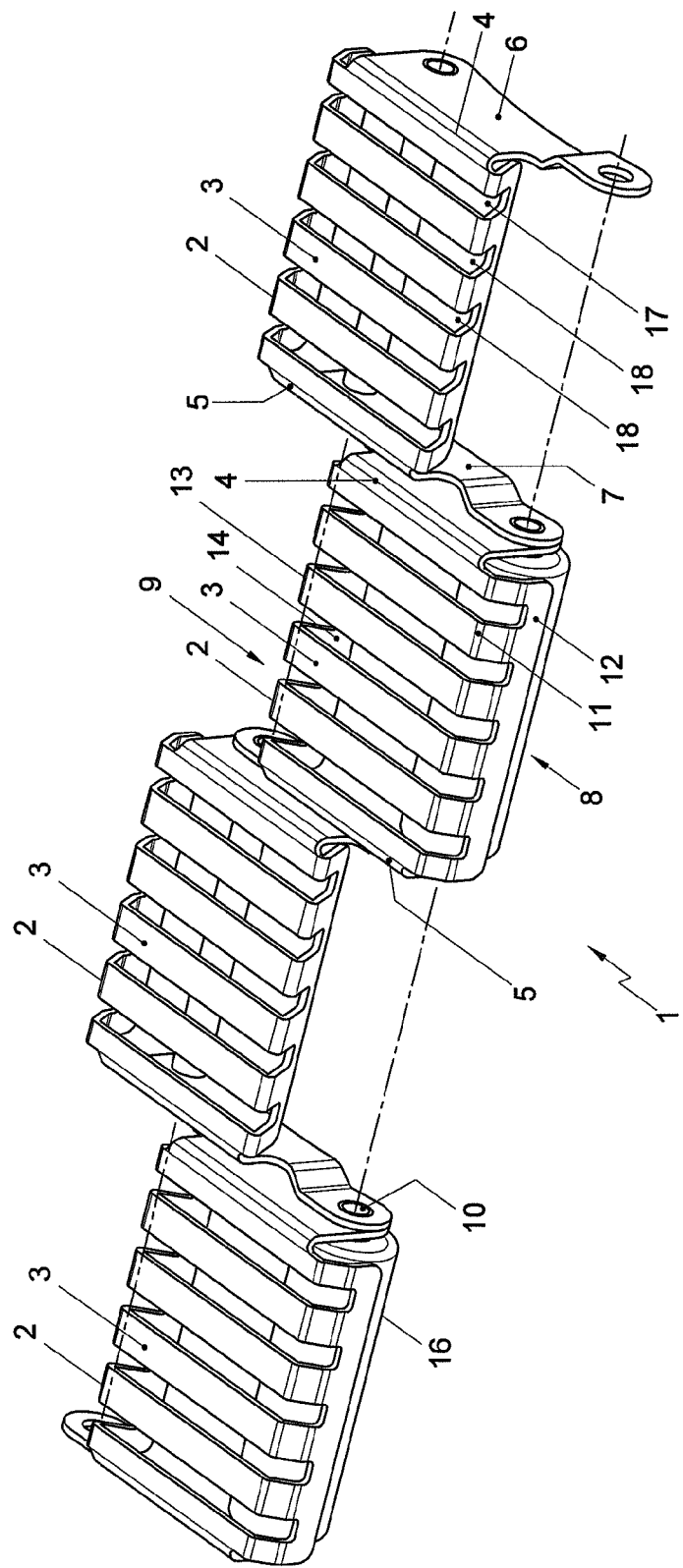
FIG. 3 shows a schematic perspective top plan view of a module built up from four body parts of FIG. 2.
Figure 4:
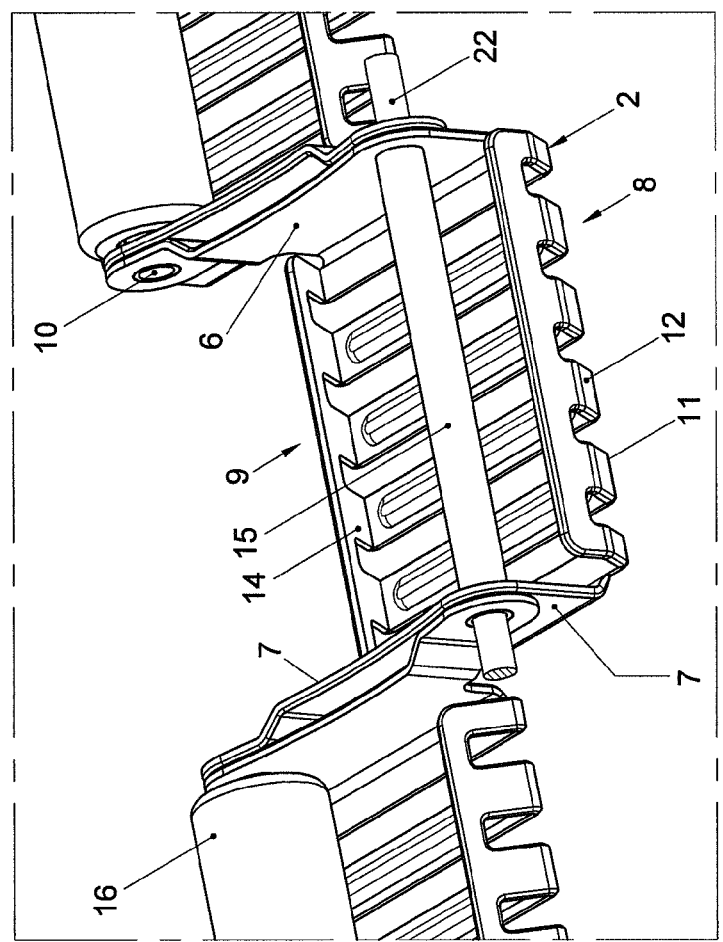
FIG. 4 shows a perspective bottom view in detail of a module of FIG. 3.

With reference to FIGS. 3 and 4, the module 1 is composed of four body parts 2. The body parts 2 are substantially identical.

The body parts are placed side by side, alternately with forward and rearward orientation. Here, adjacent body parts 2 are connected via their side faces 6, 7.

In the openings 10 of the side faces 6, 7, mainly, receiving elements 15 are received. With the aid of the receiving elements, the force transmitted by the hinge pins 22 to the side faces 6, 7 can be distributed over a larger surface.

Here, the receiving element forms a bearing bush so that the hinge pin can be prevented from grinding into the side faces 6, 7.

As shown here, the receiving element extends as a tube between two opposite openings in de side faces 6, 7 of the body part 2. As a result, a long bearing bush is formed. Preferably, the receiving element received in the openings 10 forms a fixed connection between the side faces 6, 7. As a result, a very robust and heavily loadable construction can be realized in a simple manner.

In this exemplary embodiment, the receiving element 15 forms an axle for a roller element 16 borne by the receiving element 15, which roller element is designed here as an elongated cylindrical roller. What is thus achieved is that a roller element is borne by the module 1 and will not come loose when the hinge pin is removed.

In the exemplary embodiment shown, the receiving element extends between openings 10 of side faces 6, 7 of body parts 2 located side by side. Here, a fixed connection of the two body parts 2 is opted for via two aligned openings 10 in the side faces 6, 7.

At the location of the conveying face 3, the body part 2 is provided with recesses 17.

Figure 5:
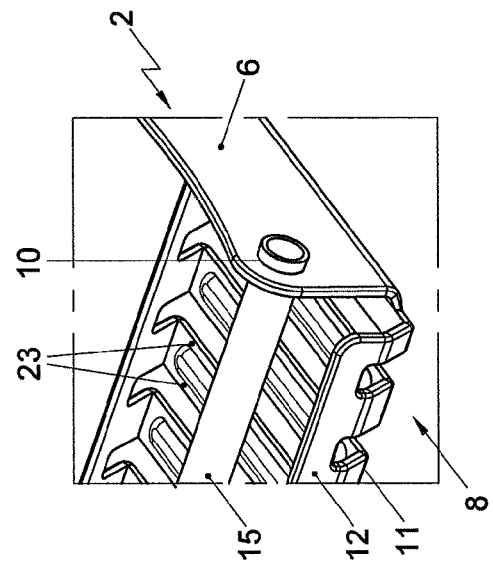
FIG. 5 shows a detail of an alternative embodiment of a body part while, with the aid of indentations, stiffening members are provided.

In the embodiment shown in FIGS. 1-4, the recesses extend in longitudinal direction of the body part 2 and continue into the front face 12 and rear face 14. As a result, the body part 2 is provided at a top side with a multiple number of grooves 18 extending in longitudinal direction, which can cooperate with fingers of a transferring device (not represented). In FIG. 5 it is shown that the body part 2 can be provided with stiffening members 23. In the exemplary embodiment of FIG. 5, the stiffening members 23 are designed as indentations extending in the edges between the grooves.

Figure 6:
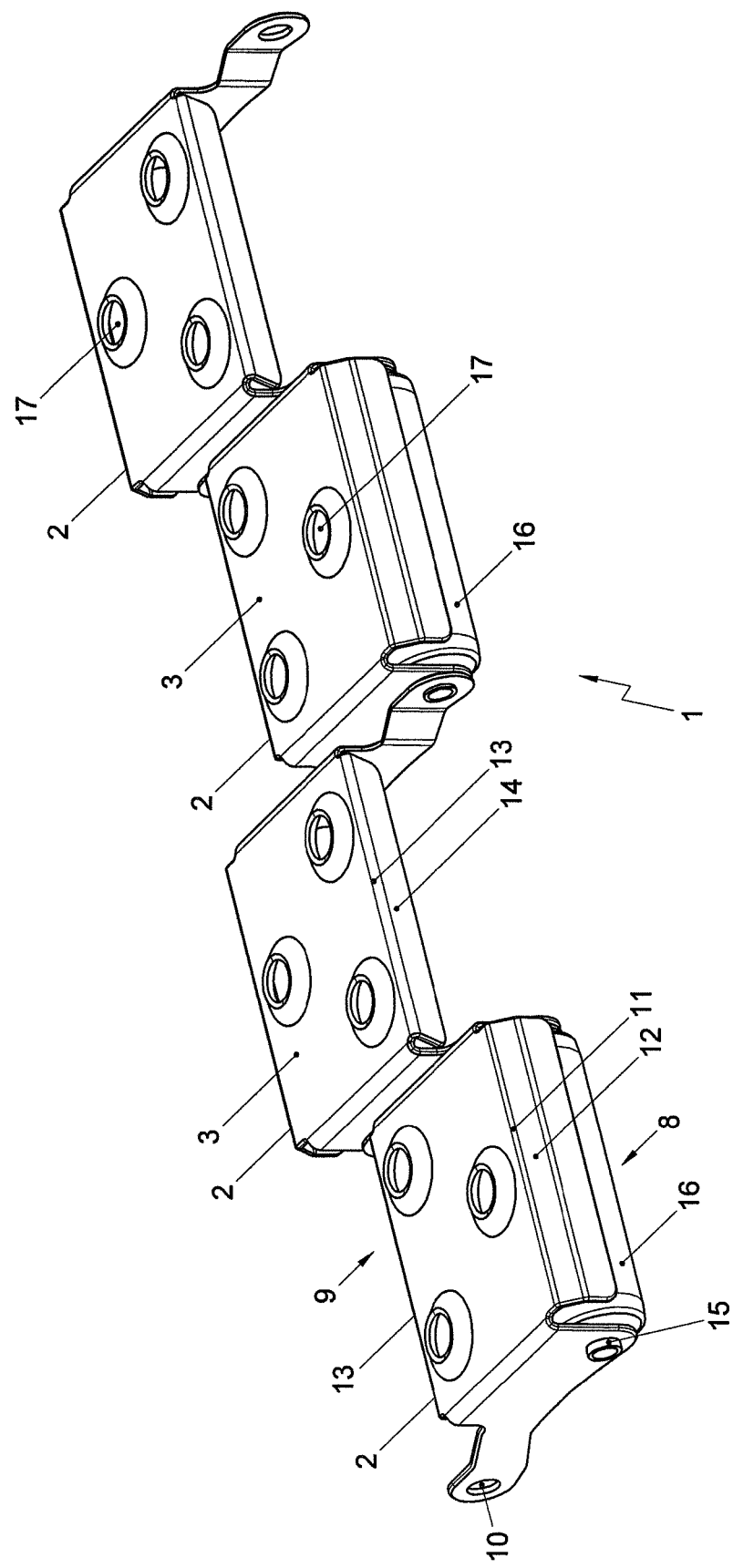
FIG. 6 shows a schematic perspective view of a variant of the module of FIG. 3, while the body part is provided with holes.

In FIG. 6, an exemplary embodiment is shown in which the recesses 17 are designed as circular holes with an upstanding rim provided in the conveying face 3 of the body part 2. In such an embodiment, the conveyor can be used in a highly suitable manner as, for instance, people mover.

By coupling a number of modules successive in conveying direction with the aid of hinge pins 22 extending through openings 10 in the side faces 6, 7 of the modules 1, a modular conveyor mat 19 can be formed. Here, preferably, transversely to the conveying direction, a multiple number of modules 1 are located side by side so that the width of the modular conveyor mat 19 can be varied.

It is preferred that the body part 2 is punched and set from sheet metal, but can also be formed with the aid of a follow-on cutting and bending tool. Preferably, the body part 2 is manufactured from stainless steel but can naturally also be formed from a different metal. The receiving elements 15 may be formed from metal, for instance steel or bronze, but can naturally also be manufactured from a different material. Most preferred, the roller elements 16 are manufactured from wear resistant material with good running properties, for instance plastic material.

Figure 7:
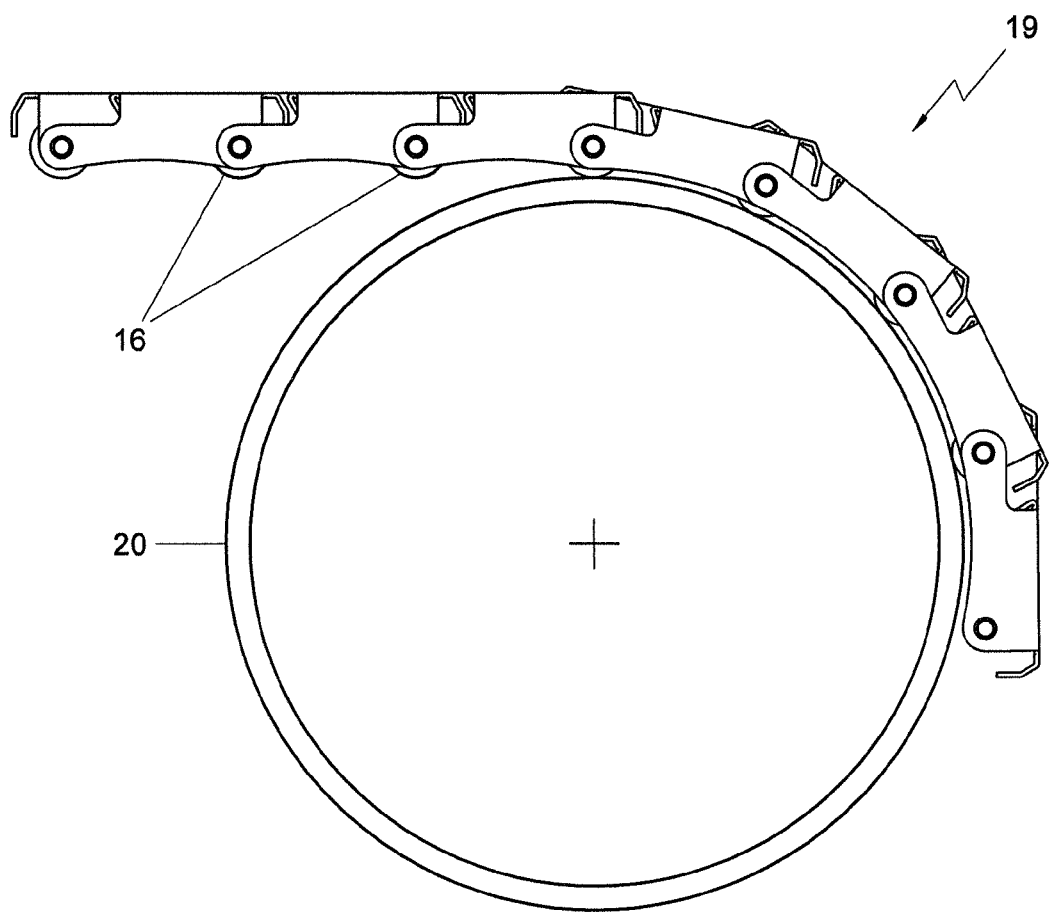
FIG. 7 shows a side view of a part of a modular conveyor mat when travelling about a return element, while the return element is designed as a stationary cylinder and wherein the conveyor mat is provided with roller elements which, when travelling, are supported on the surface of the cylinder.

With reference to FIG. 7, a side view of a part of the modular conveyor mat 19 is represented. In a manner sufficiently known to the skilled person, the modular conveyor mat 19 can be designed to be endless and can travel between two return elements 20 in a conveyor. In a particularly elegant manner, when the modular mat 19 is provided with the roller elements 16 borne on the receiving elements 20, the return element can be designed as a stationary cylinder, in particular a hollow tube. When the modular conveyor mat 19 travels around the return element 20, the roller elements 16 can bear on the circumferential surface of the cylinder. In this manner, the return element 20 can be greatly simplified with respect to the customary bearing-mounted axles with return wheels. It is noted that in general, such a fixedly arranged cylinder can be advantageously used in conveyors in which an endless modular conveyor mat travels around return elements and wherein the modular conveyor mat is built up from a number of modules successive in conveying direction which are coupled with the aid of hinge pins extending transversely to the conveying direction and reaching through openings in the modules, and wherein roller elements are provided borne on the hinge pins and/or the modules which, when travelling, can bear on the circumferential surface of the arranged cylinder 20.

The modular conveyor mat 19 described here can be advantageously utilized in particular in pasteurizers. In an advantageous manner, the conveying face 3 of the mat is made of steel. As the grooves 18 in the conveying surfaces 3 of the body parts 2 of successive modules can be aligned to form slots, the mat can cooperate with fingers of a transferring device so that products can be placed on the conveying face of the conveying mat and be taken therefrom in a simple and reliable manner. Utilizing the roller elements 16 allows for a reduction of the friction between the conveying mat 19 and the conveyor track. What is achieved by receiving the roller elements 16 on tubular receiving elements 15 is that the roller elements 16 remain attached to the modules 1 when the hinge pin 22 is removed from the mat 19. Further, through the use of the receiving elements 15, the pins 22 can be bearing-mounted better and the surface pressure between the pins 22 and the modules 1 can be very low. What can further be achieved through the use of the receiving elements 15 is that the side faces 6, 7 of a body part 2 are held together, and/or that separate body parts 2 of modules 1 are held together.

Figure 8:
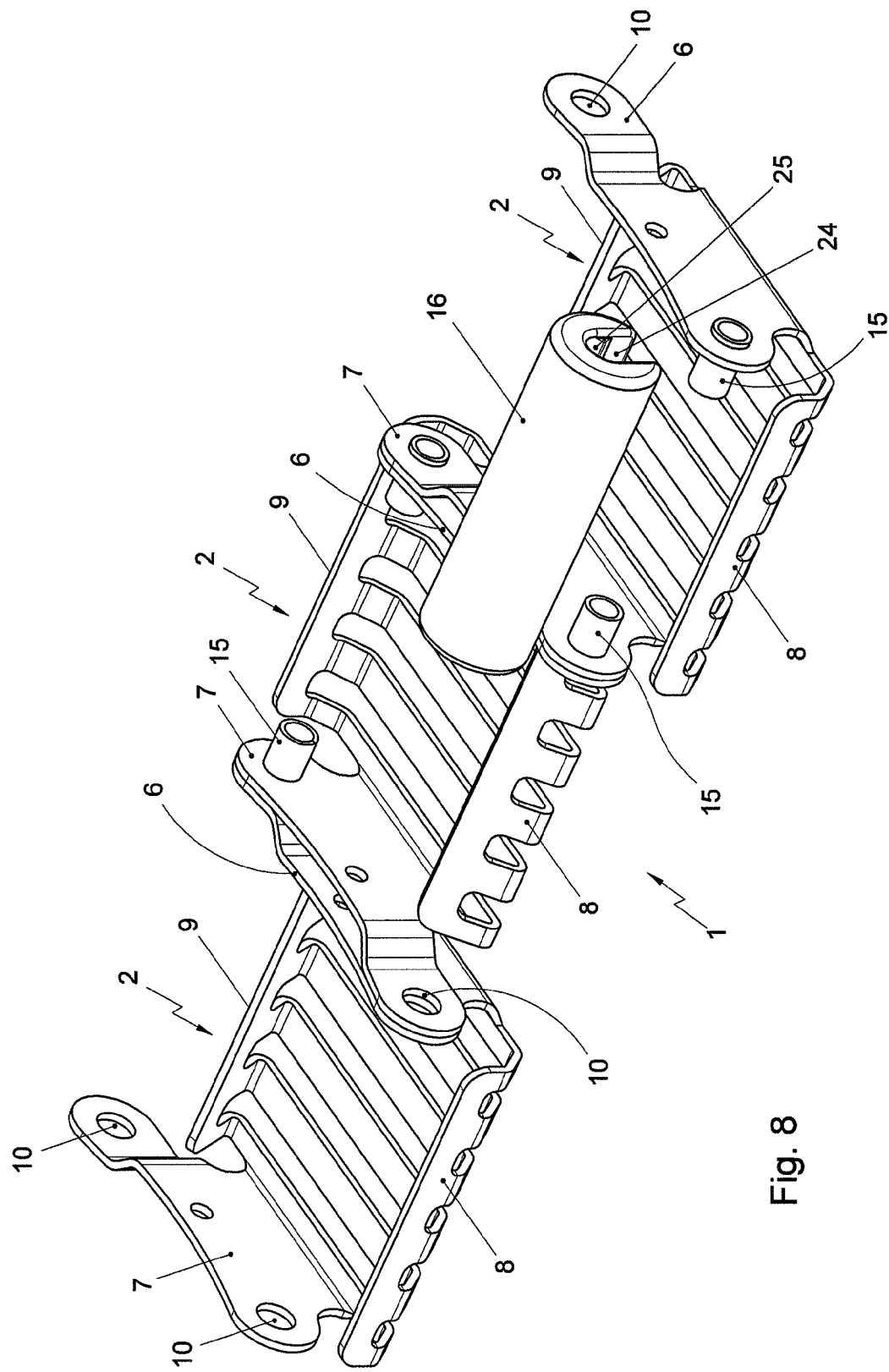
FIG. 8 shows a schematic perspective bottom view of an alternative module built up from three body parts and a roller element in detached condition.
Figure 9:
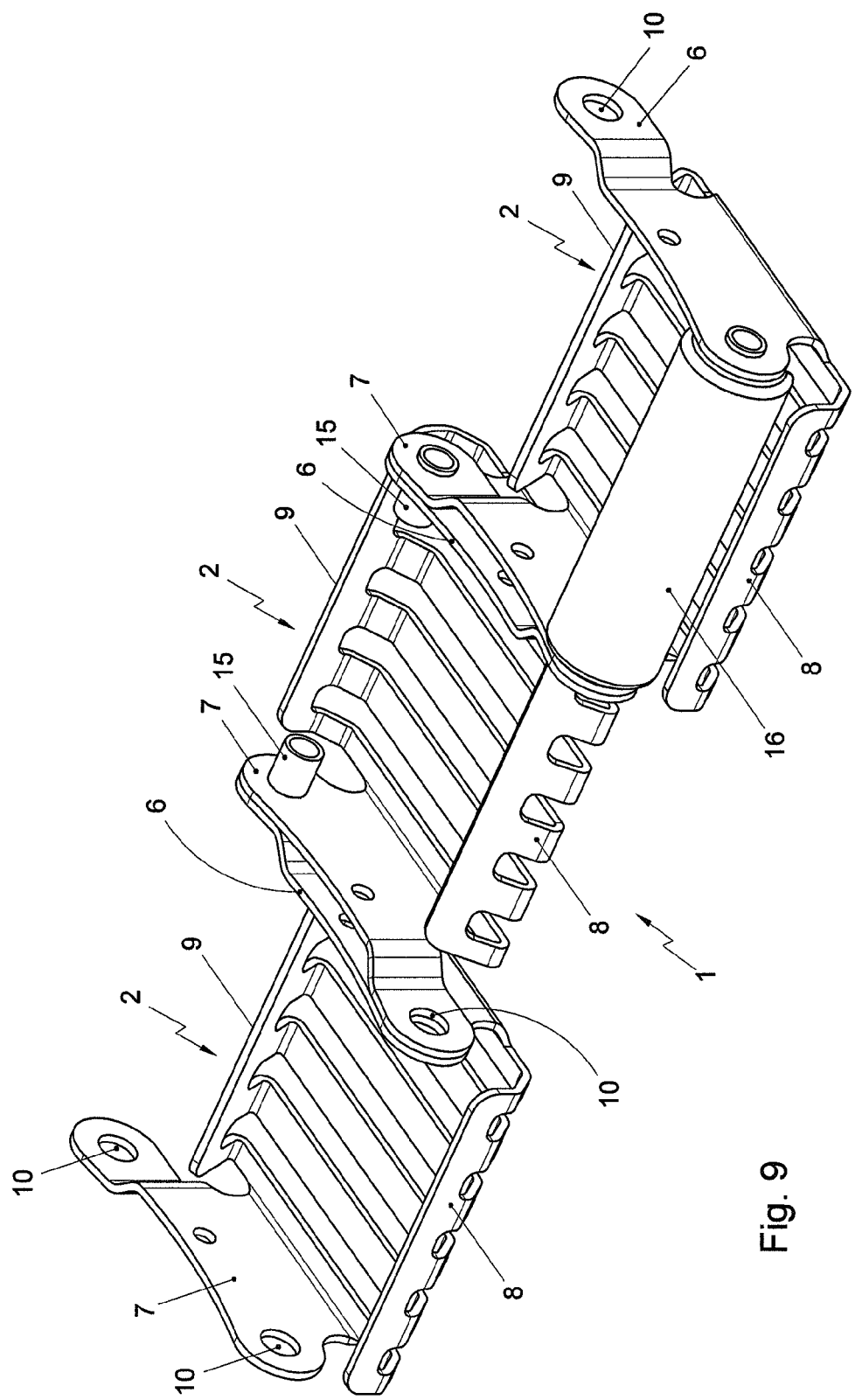
FIG. 9 shows a schematic perspective view of the module of FIG. 8 with the roller element in mounted condition.
Figure 10:
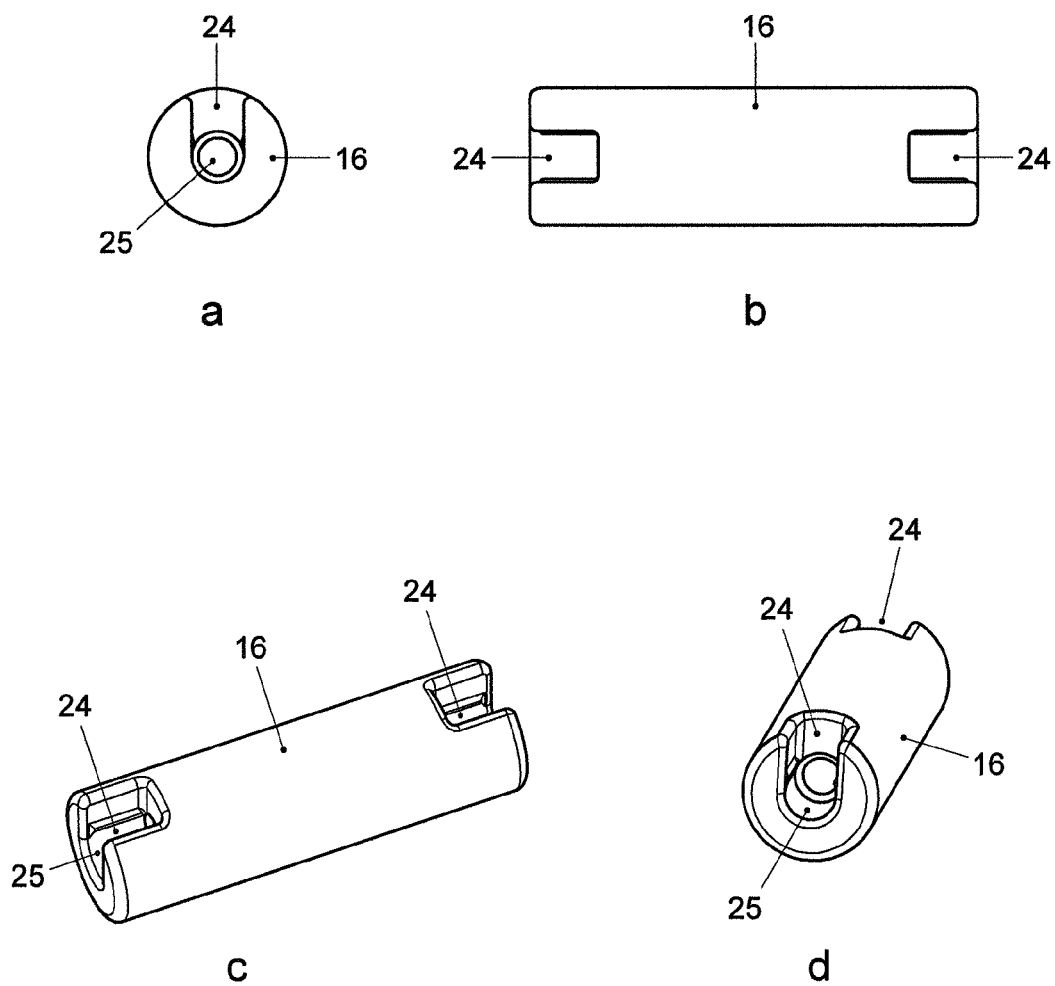
FIG. 10a, FIG. 10b, FIG. 10c and FIG. 10d show a schematic side view, a schematic top plan view and two schematic perspective views, respectively, of the roller element of the module of FIG. 9.

With reference to FIGS. 8, 9 and 10, there is shown an alternative embodiment of the module 1 which is built up from three body parts 2. In this embodiment, the tubular receiving elements 15 are designed as hollow axle journals. The roller element 16 is provided with slots 24 which terminate in blind holes 25. Via the slotted holes 24, whose width is somewhat smaller than the diameter of the axle journals, the roller elements 16 can be slid onto the axle-journal shaped receiving elements 15 until the axle-journal shaped receiving elements are bearing mounted in the blind holes 25. What can be achieved in this manner is that the roller elements 16 can be snapped fast on the modules 1, and thus form a whole with the modules 1. The blind holes 25 have a diameter which is slightly greater than that of the axle journals 15 and is rather greater than the diameter of a central bore 26 connecting the blind holes 25. The diameter of the central bore 26 is somewhat greater than the diameter of the hinge pin 22 to be fed therethrough. The diameter of the blind hole can, for instance, be eight millimetres, the diameter of the axle journal for instance seven millimetres, the width of the slot for instance be 6.8 millimetres, the width of the central bore for instance 5.5 millimetres and the diameter of the hinge pin for instance five millimetres. With the modules 1 coupled with the aid of hinge pins 22, when in loaded condition, the roller element will therefor bear on the hinge pin 22 via the central bore 26 connecting the blind holes 25.

As a result, the advantage of simple assembly of the roller elements integrated with the modules is combined with the advantage of bearing the hinge pin on the roller elements.

It will be clear to be skilled person that the invention is not limited to the embodiment represented here. For instance, the module 1 can be built up from fewer body parts, for instance one, or from more body parts, for instance eight. Further, a short receiving element can be utilized, for instance a receiving element whose width corresponds substantially to the thickness of two side faces to be coupled. Although, through for instance bending or folding over, the receiving element can highly advantageously be fixed in the openings in the side walls, it can naturally also be fixed in a different manner, or can, optionally, not be fixed. Also, in an advantageous manner, the receiving element can be formed by deep drawing the material of a side face and thus forming a whole therewith. Further, the conveying face may be of a different design, for instance a closed conveying face or, conversely, a more open surface provided with a plurality of perforations.

In addition, the basic form of the body part can be selected to be different, and front faces and/or rear faces can for instance be omitted.

Further, also, other elements can be borne on the receiving elements such as guiding elements for guiding a conveyor mat module. Optionally, a receiving element can bear more than one element, for instance a roller element and a guiding element. Receiving elements can also be left clear or even be omitted. Roller elements can also be borne on the hinge pins and can, naturally, be designed to be different than the cylindrical rollers shown in the exemplary embodiment, for instance balls or roller bearings. Further, a module may be provided with no, one or several roller elements.

Such variants will be clear to be skilled person and are understood to fall within the range of the invention as set forth in the following claims.

The invention claimed is:

1. A module for a modular conveyor mat, comprising a sheet metal body part bent-over, in cross section, into a substantially inversed U-shaped body part, wherein the connecting part of the U-shaped body part forms a conveying face and wherein the legs of the U-shaped body part form side faces located adjacent longitudinal edges of the conveying face, which side faces are provided, adjacent the front and rear side of the body part, with openings for receiving hinge pins therethrough, a receiving element is received in at least one of said openings, wherein a hinge pin extending through said at least one of said openings extends through said receiving element, and a roller is carried by said receiving element.

2. A module according to claim 1, wherein, at a rear side of the body part, the side faces extend beyond the conveying face.

3. A module according to claim 1, wherein adjacent front and rear edge, the body part is further provided with front and rear faces extending downwards relative to the conveying face.

4. A module according to claim 3, wherein the front and rear faces extend downward with a forward component.

5. A module according to claim 1, wherein the module is composed of a multiple number of body parts.

6. A module according to claim 5, wherein the body parts are substantially identical.

7. A module according to claim 5, wherein the body parts are placed side by side, alternately with forward and rearward orientation.

8. A module according to claim 5, wherein adjacent body parts are connected via their side faces.

9. A module according to claim 5, wherein the receiving element fixedly connects two body parts via two aligned openings.

10. A module according to claim 1, wherein the receiving element forms a bearing bush.

11. A module according to claim 1, wherein the receiving element extends between two opposite openings in the side faces of a body part.

12. A module according to claim 1, wherein the receiving element forms an axle for the roller carried by the receiving element.

13. A module according to claim 12, wherein the receiving element forms an axle journal.

14. A module according to claim 13, wherein, at the location of the conveying face, the body part is provided with recesses.

15. A module according to claim 1, wherein the receiving element extends between openings of side faces of body parts located side by side.

16. A modular conveyor mat, comprising a multiple number of modules successive in conveying direction, according to claim 1, which are coupled with the aid of hinge pins extending transversely to the conveying direction and reaching through openings in the modules.

17. A modular conveyor mat according to claim 16, wherein transversely to the conveying direction a multiple number of modules are located side by side.

18. A conveyor, comprising an endless conveying mat according to claim 16 travelling between two return elements.

19. A conveyor according to claim 18, wherein roller elements are provided borne on the hinge pins and/or the modules, and wherein at least one of the return elements is designed as a fixedly mounted cylinder, preferably a tube with a circumferential surface on which the roller elements of the modular conveyor mat are supported when passing around.

20. A module for a modular conveyor mat, said module comprising:
   a sheet metal body part bent-over, in cross section, into a substantially inversed U-shaped body part, having a conveying face and side faces, wherein the connecting part of the U-shaped body part forms the conveying face and wherein the legs of the U-shaped body part form the side faces located adjacent longitudinal edges of the conveying face, an opening in each of said side faces receive a hinge pin therethrough;
   a tube fixed in at least one of said openings receives said hinge pin therethrough; and
   a roller carried by said tube.

21. The module as in claim 20 in which said tube extends between said openings.

22. A module for a modular conveyor mat, comprising a sheet metal body part bent-over, in cross section, into a substantially inversed U-shaped body part, wherein the connecting part of the U-shaped body part forms a conveying face and wherein the legs of the U-shaped body part form side faces located adjacent longitudinal edges of the conveying face, which side faces are provided, adjacent the front and rear side of the body part, with openings for receiving hinge pins therethrough, wherein recesses in the body part extend in a longitudinal direction and continue into the front and rear face so that the body part is provided at a top side with a multiple number of grooves extending in the longitudinal direction for cooperation with fingers of a transferring device.

* * * * *